May 17, 1949.  A. H. KORN  2,470,744
AIR-LOCK AND VALVE FOR PNEUMATIC CONVEYING SYSTEMS
Filed Oct. 22, 1945  3 Sheets-Sheet 1
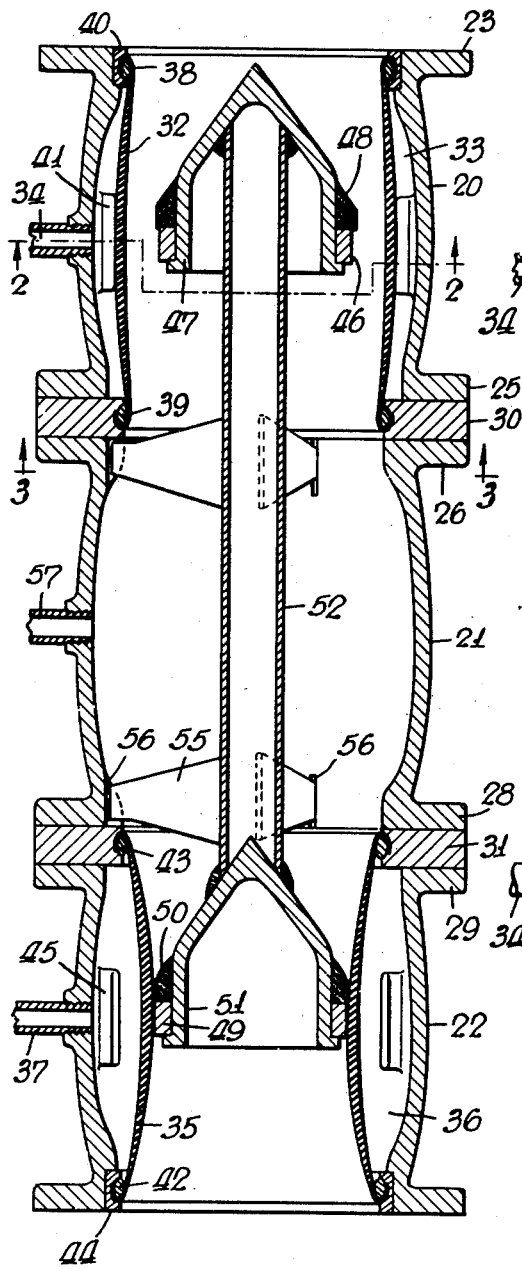
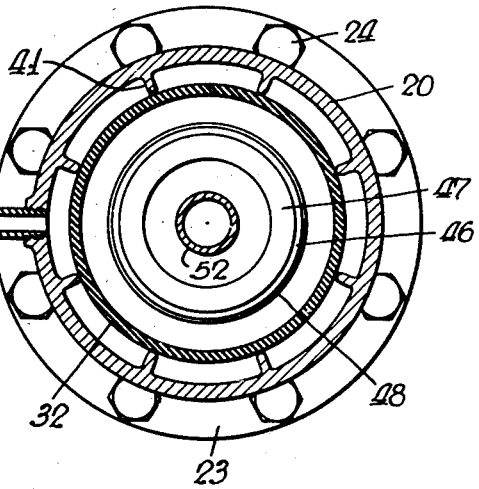
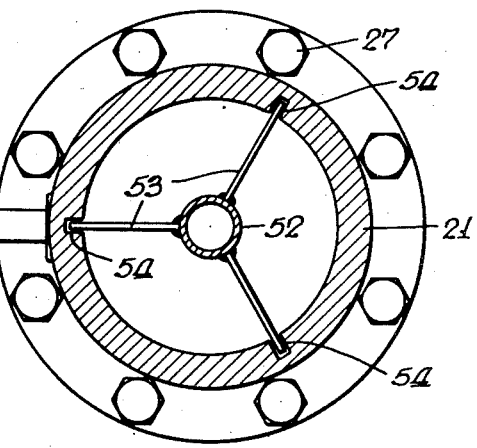
INVENTOR
Arthur H. Korn
BY Frederick Breckenfeld
ATTORNEY

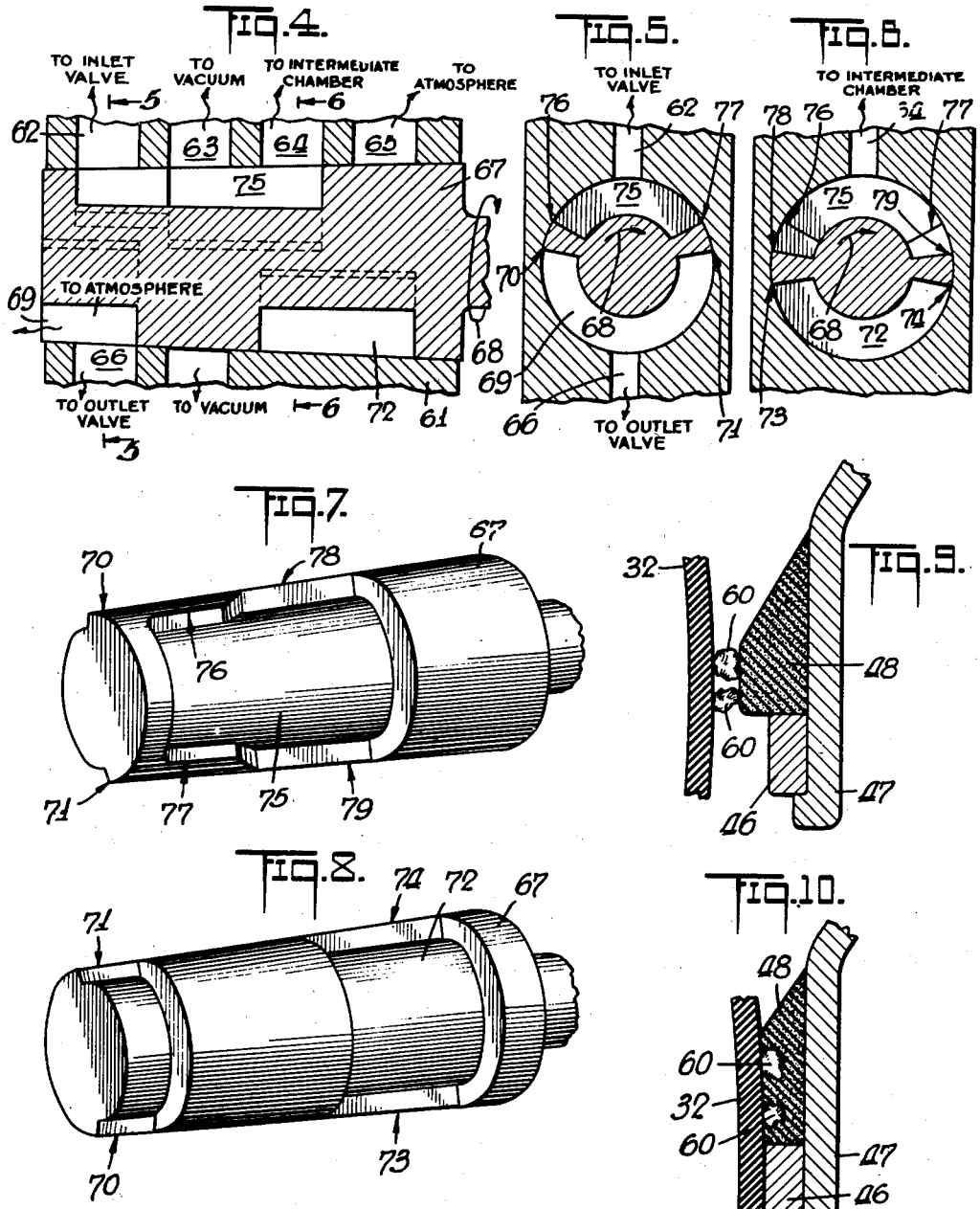

May 17, 1949.    A. H. KORN    2,470,744
AIR-LOCK AND VALVE FOR PNEUMATIC CONVEYING SYSTEMS
Filed Oct. 22, 1945    3 Sheets-Sheet 3
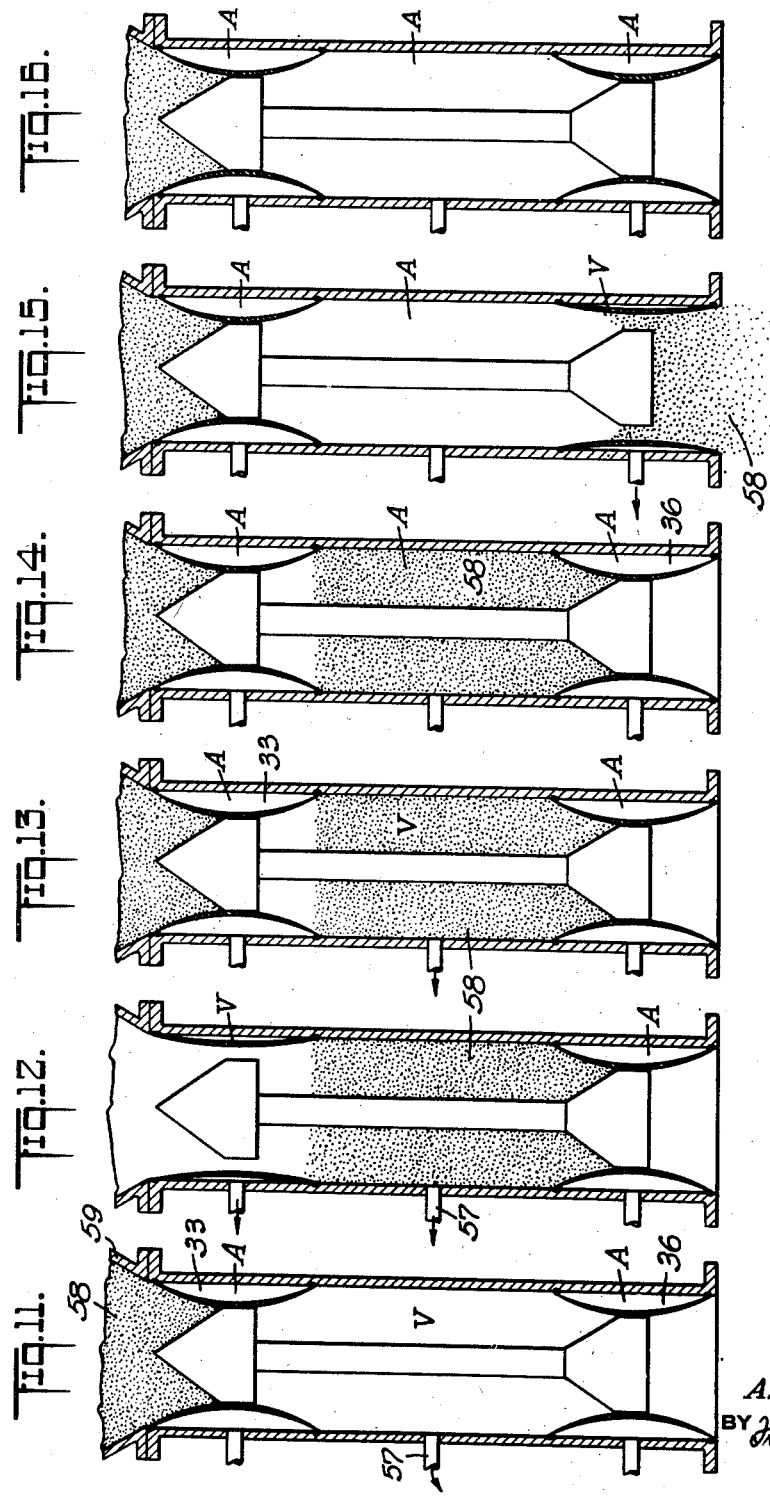
INVENTOR
*Arthur H. Korn*
BY
ATTORNEY Patented May 17, 1949

2,470,744

UNITED STATES PATENT OFFICE 2,470,744

AIR LOCK AND VALVE FOR PNEUMATIC CONVEYING SYSTEMS

Arthur H. Korn, New York, N. Y., assignor to Airborne Conveyors Corporation, New York, N. Y., a corporation of New York Application October 22, 1945, Serial No. 623,750

7 Claims. (Cl. 302—62)

My present invention relates generally to pneumatic conveying systems, and has particular reference to an improved air-lock and valve.

It is well known that solid material, in the form of flakes, grains, pellets, crystals, or similar lumps or particles, can be transported from place to place by means of a column of air or other gas which is caused to flow through a pipe-line by pressure applied at the transmitting end or by suction applied at the receiving end.

Except at the inlet end of a vacuum system or the outlet end of a pressure system, the introduction and withdrawal of material at any region where the pressure condition within the system is different from that on the outside requires a valvular instrumentality to permit the desired result to be accomplished without impairment of the pneumatic condition within the system.

For example, at the receiving end of a vacuum system, the vessel or hopper within which the material is collected (after segregation from the gas stream by centrifugal movement or the like) is under vacuum, and the withdrawal of the material is achieved by means of a so-called airlock. This consists essentially of an inlet chamber in communication with the hopper, an outlet or discharge chamber, an intermediate chamber, valves between these chambers, and a means for making the pressure in the intermediate chamber alternately equal to the sub-atmospheric pressure in the hopper and the atmospheric (or other) pressure in the outlet chamber. Whenever the intermediate chamber has a pressure equal to that in the hopper, the valve from the latter may be opened to allow the collected material to pass into the intermediate chamber; and after this valve is closed, and after the pressure in the intermediate chamber has been equalized with that in the outlet chamber, the second valve may be opened to allow the material to be discharged. This cycle of operations is then repeated, and continues indefinitely.

In devices heretofore employed for this purpose, the valves have been of mechanical character, either in the form of reciprocating or swinging gates or the like, or rotating elements, and serious disadvantages and difficulties have arisen due to the tendency of the mechanical elements to become clogged, jammed, and unduly abraded, requiring frequent costly repairs and replacements. Moreover, such devices are cumbersome, noisy, and expensive to manufacture and to operate, and they present a serious problem in properly maintaining the parts in properly lubricated condition uncontaminated by the solid particles which are constantly passing through.

It is a general object of my invention to provide a simplified apparatus and mode of procedure whereby these and other disadvantages may be successfully overcome, and whereby solid material of the character mentioned may be expeditiously moved into and out of a pneumatic conveying system by means of a relatively simple and inexpensive device which is reliable and noiseless in operation and practically immune to abrasion and wear. The present improved apparatus is devoid of mechanism such as mechanical gates or the like, and those few moving parts which are involved are either maintained at all times out of contact with the solid material, or are of such character as to be substantially unaffected by it in any deleterious manner.

The successful achievement of this desirable result is predicated upon the special design and employment of a valve whose operation involves nothing more than a slight deflection of a flexible element of rubber or equivalent material, and upon a special arrangement of two such valves in a manner which permits their activation to be achieved by purely pneumatic means. In this way, I am enabled to utilize, for the operation of the device, the very pressure differentials whose existence makes the use of the device necessary. This results in low cost of manufacture, simplicity and compactness, and high operating efficiency.

A particular feature of my invention resides in the ability to provide and employ a common continuously-operable control device for the means which alternately varies the pressure in the intermediate chamber and for the valve operations. This results in an automatic operation of the apparatus whereby it may be caused to function continuously without attention, the several procedures of the operating cycle being carried out in repeated accurately-timed sequences.

Certain other features of my invention relate to the arrangement of the parts entering into the apparatus as a whole, while others are directed to details of the valves themselves.

From a broad aspect, the invention relates to the movement of material from one region to another, where the regions are at different pressures. By way of example, I have herein chosen to illustrate my invention and explain its use in the withdrawal of solid material from the receiving end of a suction-operated pneumatic system into a region of atmospheric pressure, but it will be understood that the broader phases of my invention are not necessarily limited in their applicability to any such specific purpose.

One way of achieving the foregoing general objectives and advantages, and such other objects and advantages as may hereinafter appear or be pointed out, is illustratively exemplified in the accompanying drawings, in which:

Figure 1 is a longitudinal cross-sectional view of an air-lock device of the present improved character;

Figures 2 and 3 are cross-sectional views taken substantially along the lines 2—2 and 3—3, respectively, of Figure 1;

Figure 4 is a longitudinal cross-sectional view through a control device of the preferred character;

Figures 5 and 6 are cross-sectional views along the lines 5—5 and 6—6, respectively, of Figure 4;

Figures 7 and 8 are obverse and reverse perspective views, respectively, of the relatively movable element of the control device;

Figures 9 and 10 are fragmentary, enlarged details of the valve seat, showing its mode of cooperation with the movable valve member; and Figures 11–16 are diagrammatic views, each similar to Figure 1, showing the sequence of operations which are performed during one cycle.

Referring to Figures 1–3, it will be observed that the device consists essentially of a conduit having a pair of valves arranged in tandem therein, positioned at longitudinally-spaced regions. For the sake of simplicity of manufacture, and ease of assembly and disassembly of the parts, the conduit is preferably formed of three sections 20, 21 and 22, each of which is substantially tubular and is provided with flanges at its ends. Thus, the flange 23 on the section 20 facilitates its attachment to the hopper (not shown) at the receiving end of a suction-operated pneumatic conveying system. This attachment may be effected by means of bolts 24 or the like, as indicated in Figure 2. Similarly, the flanges 25 and 26 permit the sections 20 and 21 to be readily assembled, by means of studs 27 or the like, as indicated in Figure 3; and the flanges 28 and 29 cooperate in a similar manner to hold the sections 21 and 22 together.

For a purpose presently to be described, a ring 30 is introduced between the flanges 25 and 26, and a similar ring 31 is introduced between the flanges 28 and 29. Each of these rings is split, i. e., it is made of two semi-circular parts.

In the section 20 I mount a tubular sleeve member 32, composed of deflectable material such as rubber or its equivalent. This member is concentrically arranged with respect to the section 20, and has its opposite ends sealed to the conduit so that a closed annular space 33 is provided between the sleeve member 32 and the conduit wall. In this wall, there is a connection opening 34 by means of which the pressure within the annular space 33 may be varied, as will be presently pointed out. A similar tubular sleeve member 35 is mounted in concentric relation within the conduit section 22, its ends being sealed to the conduit wall so as to provide an annular space 36 between the member 35 and the conduit wall. Here, too, a connection opening 37 is provided to permit the pressure in the annular space 36 to be varied.

The sleeve members 32 and 35 are substantially the same, being composed of the same general type of deflectable material, and they differ only in the fact that the member 32 normally assumes the convex or barrel-shaped contour shown in Figure 1 when the pressures on its opposite sides are equal, whereas the member 35 normally assumes the concave or spool-shaped contour when the pressures on its opposite sides are equal.

The member 32 is secured to the conduit by having its opposite end margins turned outwardly, and by mounting rings 38 and 39 beneath these out-turned edges. Each of these rings is substantially elliptical in cross-section, the major axis being parallel to the axis of the conduit. The turned-back portions of the sleeve member 32 are vulcanized or otherwise firmly secured to the rings 38 and 39, and the latter are mounted, respectively, in annular retaining members secured to the conduit wall, and provided with grooves to accommodate the rings. The ring 38 is mounted within a retaining member 40 which fits in a suitable recess provided for this purpose in the end portion of the section 20. The retaining member for the ring 39 is the split flange 30 hereinbefore mentioned. Each of the rings 38 and 39 clamps the corresponding out-turned margin of the sleeve member 32 against the conduit wall, a sealed joint being thus produced. The member 40 may be split, if desired, but this is not absolutely essential. In assembling the parts, the sleeve member 32 may be secured to the ring 40, this assembly may then be inserted endwise into the section 20 until the ring 40 seats itself as shown, and the two sections of the element 30 may then be applied to hold the parts in the relationship illustrated, the final step being merely the application and tightening of suitable studs or fastening elements as indicated at 27 in Figure 3.

On the interior of the section 20, a series of ribs or projections 41 may be provided, for the purpose of lending support to the midportion of the sleeve member 32 when it assumes the position shown in Figure 1.

The sleeve member 35 is similarly mounted in association with the section 22, its out-turned ends being engaged around rings 42 and 43, respectively, the ring 42 being secured to an annular element 44, and the ring 43 being supported within the split flange-like element 31. The elements 31 and 44 are provided with grooves to accommodate the rings. The section 22 may also be provided with interior ribs 45 or the like, to lend support to the midportion of the sleeve member 35 when the latter is in its outwardly-deflected position.

Each of the sleeve members 32 and 35 is adapted to deflect between a barrel-shaped contour and a spool-shaped contour, this deflection being achieved by variation of the pressures applied to the sleeve members. Whenever the sleeve members are deflected inwardly, they establish contact with corresponding centrally disposed valve seats; whenever they deflect outwardly, they bear against the ribs 41 and 45, respectively. The elliptical cross-sectional nature of the rings 38, 39, 42 and 43 permits these deflections to take place with a minimum of wear and tear and without any danger of undesirably weakening the sleeves at their anchored ends.

The valve seat with which the sleeve 32 cooperates consists of a ring 46 mounted on a tubular member 47, and a second ring 48 mounted alongside of it. The ring 46 is of relatively unyielding material, while the ring 48 is of relatively soft and yieldable material. The ring 48 has an external diameter slightly greater than that of the ring 46. The purpose of this arrangement of parts will be described more fully hereinafter in connection with Figures 9 and 10.

The supporting tube 47 is cone-shaped, as shown, with the apex of the cone directed toward the incoming material.

A similarly-constructed valve seat is disposed centrally within the section 22, and is adapted to be engaged by the sleeve member 35. It consists of a ring 49 of relatively unyielding material and an adjacent ring 50 of relatively soft yieldable material, the latter having a normal external diameter slightly greater than that of the ring 49. The seats 49 and 50 are mounted on a tubular support 51 which is cone shaped, as shown.

The supports 47 and 51 may be held in proper concentric positions within the device by securing them both to a longitudinal rod or tube 52 which is in turn supported within the conduit by one or more spiders extending radially into engagement with the central section 21 of the device. One such spider is indicated most clearly in Figure 3, and has been shown as consisting of three radial fins 53 whose outer ends are supported in grooves 54 provided for this purpose on the interior surface of the section 21. A similar set of radial fins 55, similarly supported in grooves 56, lends added support to the rod 52.

That region of the conduit which lies on the outside of the valve seat 46—48 (i. e., the upper end of the conduit as viewed in Figure 1) constitutes what is hereinafter referred to as an inlet chamber. It is this chamber which is constantly in communication with the hopper in the pneumatic conveying system. That portion of the conduit which lies outside of the valve seat 49—50 (i. e., the portion at the bottom as viewed in Figure 1) is hereinafter referred to as an outlet chamber, this chamber being in communication with the bin or other receptacle into which the material is to be ultimately discharged. That central portion of the conduit which lies between the valve seats constitutes what is hereinafter referred to as an intermediate chamber. The pressure in this intermediate chamber can be varied by means of a connection opening 57 formed in the wall of the central section 21.

Before describing the control device by means of which the apparatus may be automatically operated, reference is directed to Figures 11–16, which depict the successive procedures which constitute a single cycle of operation.

In Figure 11, both valves are closed, and a mass of solid material 58 is shown in the collection hopper 59 of the suction-operated pneumatic conveying system with which the present device is associated. The sleeve member 32 is retained in the closed position shown by virtue of the fact that atmospheric pressure has been introduced into the space 33. The existence of atmospheric pressure in this space is indicated in Figure 11 by the letter A. This pressure being greater than the vacuum within the hopper 59, the sleeve member 32 is deflected into the spool-shaped position in which it bears against its valve seat and keeps this upper or inlet valve closed.

The first step in the cycle of procedures is to adjust the pressure in the intermediate chamber so that it will be equal to the sub-atmospheric pressure in the hopper 59. This is achieved by connecting the opening 57 with a source of vacuum as indicated by the arrow in Figure 11, and the resultant vacuum which is produced in the intermediate chamber is indicated by the letter V.

In each of Figures 12–16, in a similar manner, the letter A indicates the existence of atmospheric pressure, and the letter V indicates the existence of sub-atmospheric pressure or vacuum.

The second step is indicated in Figure 12. The pressures in the intermediate and inlet chambers having been equalized, a vacuum is produced in the annular valve space 33, and since the pressures on the opposite sides of the sleeve member 32 are thus equalized, this valve assumes its normal open position, and the collected material 58 is thereby allowed to fall downwardly into the intermediate chamber. A suitable screen may be mounted in the connection opening 57 to prevent any of the material from passing into the pipe or conduit 57.

The next step consists in again closing the inlet valve. This is achieved by introducing atmospheric pressure into the annular space 33, as indicated in Figure 13.

The next step is indicated in Figure 14, and consists in varying the pressure in the intermediate chamber so as to make it equal to that in the outlet chamber. This is achieved by disconnecting the pipe 57 from the source of vacuum, and establishing a connection, instead, to a source of atmospheric pressure.

As indicated in Figure 15, the next step consists in applying a vacuum to the annular space 36 surrounding the outlet valve. This causes this valve to open, and allows the accumulated material to pass from the intermediate chamber into and through the outlet chamber to the point of ultimate discharge or collection.

The final step is indicated in Figure 16 and consists in re-closing the outlet valve. This is achieved by re-establishing atmospheric pressure in the annular space 36.

The cycle is then repeated, by varying the pressure in the intermediate chamber to make it again equal to the pressure in the inlet chamber, and this restores the parts to the relationships and pneumatic conditions indicated in Figure 11.

It will be observed that the valves are of such character that a streamlined path of travel is afforded for the solid material which passes through the device. At no time does the solid material come in contact with any mechanical parts which might become damaged or abraded.

The smooth operation of the device requires, of course, that the closing of each valve be firm and secure. It is for the purpose of assuring this result that each valve seat is composed of the two portions hereinbefore mentioned. In Figures 9 and 10, for example, the rings 46 and 48 of the inlet valve have been shown on an enlarged scale, and the sleeve member 32 has been indicated in the process of closing. In the event that one or more particles of the solid material, as indicated at 60, are positioned in the path of the member 32 as it approaches the valve seat, these particles will necessarily contact the relatively yieldable ring 48 first. However, since this element is soft and yieldable, the continued deflection of the sleeve member, as indicated in Figure 10, will compress the particles 60 into the element 48, and this will assure a tight closure between the sleeve 32 and the main valve seat portion 46. Upon subsequent opening of the valve, the ring 48 will spring back to its initial position, thus expelling the temporarily-embedded particles 60 and allowing them to pass through the valve opening.

The elements 46 and 48 may be composed of any suitable material. For example, the portion 48 may consist of soft sponge rubber or its equivalent readily compressible from the normal shape of Figure 9 into the compressed condition indicated in Figure 10, and readily returnable by its inherent resilience to the normal position of Figure 9 when pressure upon it is released. The portion 46 may also be composed of rubber or its equivalent, but will be of relatively unyielding character.

The valve seat portions 49 and 50 are constructed and function in the same way.

Reference is now directed to Figures 4–8, in which I have illustrated a preferred control device for automatically effecting the series of operations hereinbefore described in connection with Figures 11–16. The control device consists essentially of a relatively fixed member having ports communicating, respectively, with the inlet and outlet valves, with the intermediate chamber, and with the two different pressure sources. (Where the apparatus is used in connection with a suction-operated pneumatic conveying system for the purpose of discharging the collected material to a region at atmospheric pressure, the two pressure sources are (a) a source of vacuum and (b) the atmosphere itself.) It is preferable, of course, that the vacuum source be the same as that which produces the suction in the conveying system itself. Coupled with this relatively fixed member is a relatively movable member which is provided with suitable passages for establishing communications, in predetermined sequences, between the two sources of pressure, on the one hand, and the intermediate chamber and the valves, on the other hand.

In the preferred device illustrated, the relatively fixed member assumes the form of a body having a substantially cylindrical bore therein, the ports communicating with this bore. Such a member is designated by the reference numeral 61, and the ports are designated by the reference numerals 62—66. The port 62 communicates with the annular space 33 surrounding the inlet valve member 32. The port 66, arranged diametrically opposite the port 62, is connected to the annular space 36 surrounding the outlet valve member 35. The port 63 is of annular shape, and is connected to the source of vacuum. The port 64 is aligned with the port 62 and is connected to the intermediate chamber, i. e., to the connection pipe 57. The port 65 is also aligned with the port 62 and is caused to communicate with the atmosphere.

The relatively movable member assumes the form of a substantially cylindrical body 67 which fits snugly within the bore in the body 61 and is adapted to be continuously rotated about its axis. As will be presently pointed out, the member 67 is symmetrical about a longitudinal plane, the plane referred to being the plane of the paper as viewed in Figure 4, and for this reason the member 67 may be rotated in either direction with the same effect. For the purpose of explaining the operation, it will be assumed that this member is rotated continuously in the direction of the arrows 68 of Figures 4–6.

Adjacent to one end of the member 67 and in alignment with the ports 62 and 66, a passage 69 is provided which extends arcuately through slightly more than 180° and communicates at its end with the atmosphere. Its controlling edges are designated by the reference numerals 70 and 71 in Figures 7 and 8.

On the same side of the member 67, but nearer its opposite end, there is an arcuate passage 72 which is co-extensive in its longitudinal dimension with both ports 64 and 65. Whenever it communicates with these ports, it establishes a connection between the intermediate chamber and the atmosphere. Its operative edges are designated by the reference numerals 73 and 74 in Figure 8.

On the side of the member 67 shown in Figure 7, and corresponding to that portion which is uppermost in Figures 4–6, there is an arcuate passage 75 which is co-extensive in its longitudinal dimension with the ports 62, 63 and 64. In its arcuate dimension it has a relatively narrow portion which aligns with the ports 62 and 66, the operative edges of this portion being designated by the reference numerals 76 and 77 in Figure 7; and it has a relatively wider portion whose operative edges are designated by the reference numerals 78 and 79.

The disposition of the parts, as shown in Figures 4–6, corresponds to the state of affairs depicted in Figure 12. Thus, through the passage 75 a communication is established between the source of vacuum 63 and both the inlet valve and the intermediate chamber; through the passage 69 a communication is established between the output valve and the atmosphere. The passage 72 is momentarily inoperative.

As the edge 70 sweeps across the port 62, communication is established between this port and the passage 69. This connects the inlet valve to the atmosphere and brings about the state of affairs indicated in Figure 13. This atmospheric connection is maintained until the edge 71 reaches the port 62, and thus leaves the port 62 in communication with the atmosphere throughout the steps indicated, successively, in Figures 13, 14, 15, 16 and 11.

Shortly thereafter, the edge 73 sweeps across the port 64, and establishes communication between this port and the passage 72, thereby connecting the intermediate chamber to the atmosphere and bringing about the state of affairs indicated in Figure 14. This connection to the atmosphere continues until the edge 74 sweeps across the port 64, and the connection between the intermediate chamber and the atmosphere is thus maintained throughout the steps indicated in Figures 14, 15 and 16.

As the edge 71 presently sweeps across the port 66, it discontinues the connection between the outlet valve and the atmosphere, and as the edge 77 sweeps across the port 66 it establishes connection between the outlet valve and the passage 75, hence with the source of vacuum, and this brings about the state of affairs indicated in Figure 15.

Shortly thereafter, the edge 76 sweeps across the port 66, and disconnects the vacuum communication. Then, as the edge 70 sweeps across the port 66, connection between the outlet valve and the atmosphere, through the passage 69, is again established. This brings about the state of affairs indicated in Figure 16, and this state of affairs is maintained throughout the stages indicated, successively, in Figures 16, 11, 12, 13 and 14.

The next edge to become operative is the edge 79 which sweeps across the ports 63 and 64 and establishes a communication, through the passage 75, between the intermediate chamber and the source of vacuum, thus bringing about the state of affairs indicated in Figure 11.

Very shortly thereafter, the edge 77 sweeps across the port 62, and thereby brings the inlet valve also into communication with the vacuum, through the passage 75, thereby re-establishing the conditions indicated in Figure 12, the parts being now restored to the relationship shown in Figures 4–6.

The body 67 may be continuously rotated by any convenient relatively inexpensive source of power, such as an electric motor or the like. It is preferably tapered to a slight extent, as indicated upon an exaggerated scale in Figures 4–8, to compensate for wear. It may be freely lubricated so that it will rotate smoothly and efficiently, and there is no danger of contamination since none of the parts of the control device ever comes in contact with the material passing through the device.

It will thus be observed that I have provided an apparatus of unusual simplicity, yet highly efficient and reliable in carrying out the desired purpose of continuously withdrawing material from the pneumatic conveying system. In operation, the apparatus functions smoothly and noiselessly, and can safely be relied upon to operate over long periods of time without interruption and without requiring any special care.

It will be understood that changes in many of the details herein described and illustrated may obviously be made by those skilled in the art without necessarily departing from the spirit and scope of the invention as expressed in the appended claims.

Having thus described my invention and illustrated its use, what I claim as new and desire to secure by Letters Patent is:

1. In a pneumatic system including regions of different pressure, an air-lock interposed between said regions and comprising inlet and outlet chambers and an intermediate chamber, the inlet and outlet chambers communicating respectively with said regions of different pressure, means for varying the pressure in said intermediate chamber to make it alternately equal to said different pressures, a pair of valves positioned between the intermediate chamber and the inlet and outlet chambers respectively, each valve comprising a centrally disposed valve seat and a deflectable tubular sleeve surrounding said valve seat and adapted to deflect into and out of a valve-closing position in contact with said valve seat, the deflections of said sleeve being responsive to the pressures on its opposite sides, and means for subjecting the opposite sides of each sleeve to said different pressures in a predetermined timed sequence to establish communication between the chambers whose pressures have been equalized and to seal off communication between the chambers whose pressures are different.

2. In a pneumatic system, the combination of elements set forth in claim 1, one of said deflectable sleeves having a normal shape in which it is in contact with the valve seat to close the valve, the other having a normal shape in which it is out of contact with the valve seat to open the valve, the valve which is normally closed being positioned adjacent to the region of greater pressure.

3. In a pneumatic system, an air-lock comprising a conduit whose opposite ends communicate with regions of different pressures, a valve in each of two longitudinally-spaced sections of the conduit and comprising a valve seat centrally disposed in said section and a tubular deflectable sleeve member surrounding said valve seat, means sealing the ends of each sleeve member to the conduit, each sleeve member being adapted to deflect into and out of contact with its valve seat in response to differences in pressure on its opposite sides, and means for establishing communications at predetermined times and in predetermined sequence between the annular spaces surrounding said sleeve members and said regions of different pressure.

4. In a pneumatic system, the combination set forth in claim 3, each sleeve member having each of its end margins turned outwardly, and said sealing means comprising a ring disposed beneath each out-turned margin and clamping the latter against the conduit wall.

5. In a pneumatic system, the combination set forth in claim 3, each sleeve member having each of its end margins turned outwardly, and said sealing means comprising a ring disposed beneath each out-turned margin and clamping the latter against the conduit wall, said ring being elliptical in cross-section with the major axis parallel to the conduit axis, the conduit wall being provided with annular grooves to accommodate said rings.

6. In a pneumatic system, the combination with the elements set forth in claim 3, of an axial post connecting said valve seats, and a supporting spider carried by said post and secured to the conduit wall in the region between said sleeve members.

7. In a pneumatic system, the combination set forth in claim 3, each valve seat comprising a relatively unyielding portion and an adjacent portion of readily-compressible material having an external diameter greater than that of said unyielding portion.

ARTHUR H. KORN.

REFERENCES CITED

The following references are of record in the file of this patent:

UNITED STATES PATENTS

| Number | Name | Date |
| --- | --- | --- |
| 1,709,949 | Rasmussen et al. | Apr. 23, 1929 |
| 1,861,726 | Trout | June 7, 1932 |
| 1,873,138 | Mitchell | Aug. 23, 1932 |
| 1,943,589 | Domina | Jan. 16, 1934 |
| 1,970,021 | Peters et al. | Aug. 14, 1934 |
| 2,060,748 | Roberts et al. | Nov. 10, 1936 |
| 2,071,197 | Burns et al. | Feb. 16, 1937 |

FOREIGN PATENTS

| Number | Country | Date |
| --- | --- | --- |
| 360,943 | Great Britain | Nov. 9, 1931 |